United States Patent [19]
Hall et al.

[11] 3,919,335
[45] Nov. 11, 1975

[54] STABILIZATION OF CHLOROAROMATICS

[75] Inventors: Richard H. Hall, Midland; Daniel H. Haigh, Beaverton; Wesley L. Archer, Midland; Peter West, Wellesley, all of Mich.

[73] Assignee: The Dow Chemical Company, Midland, Mich.

[22] Filed: Mar. 5, 1973

[21] Appl. No.: 337,941

[52] U.S. Cl.......................... 260/651 R; 203/6; 203/7; 203/8; 203/57; 252/388; 252/394
[51] Int. Cl.$^2$.......................................... C07C 25/14
[58] Field of Search .......................... 203/6, 7, 8, 57; 260/651 R, 649 R; 252/388, 394, 396, 380

[56] References Cited
UNITED STATES PATENTS

| | | | |
|---|---|---|---|
| 2,440,100 | 4/1948 | Klabunde | 260/652.5 R X |
| 2,517,894 | 8/1950 | Larchar | 260/652.5 R X |
| 2,567,621 | 9/1951 | Skeeters | 260/652.5 R |
| 3,060,125 | 10/1962 | Sims | 260/652.5 R X |
| 3,549,715 | 12/1970 | Cormany et al. | 260/652.5 R |

*Primary Examiner*—Howard T. Mars
*Attorney, Agent, or Firm*—David H. Thurston; Glwynn R. Baker

[57] ABSTRACT

Benzyl chloride, (α-chlorovinyl)toluene, and other such aromatic compounds containing labile side chain chlorine atoms are inhibited against chemical attack on aluminum by the presence of a small amount of a nitroalkane, preferably nitromethane. The nitroalkane inhibitor is particularly useful to prevent corrosion, polymerization, and decomposition during distillation and storage of such reactive chlorinated aromatics.

11 Claims, No Drawings

STABILIZATION OF CHLOROAROMATICS

BACKGROUND OF THE INVENTION

This invention relates to the stabilization of aromatic compounds containing labile side chain chlorine. It relates particularly to the stabilization of such compounds in the presence of aluminum.

Aromatic compounds with aliphatic substituents having labile chlorine atoms are known to be highly reactive with metals such as aluminum and iron. Storage and processing of such compounds usually requires glass or glass-lined equipment or equipment made of or lined with expensive, highly inert metals such as nickel, tantalum etc. Aromatic compounds of this type include benzyl chloride, ethylbenzyl chloride, ($\alpha$-chlorovinyl)-toluene, vinylbenzal chloride, chloromethyl-naphthalene, 1,2-dichloro-1-tolylethane, and the like. Pure vinylbenzyl chloride is known to be noncorrosive to aluminum under ordinary conditions, but the crude material as obtained from the gas phase chlorination of vinyltoluene and even technical or partially purified grades of this compound contain appreciable quantities of one or more of the reactive compounds previously listed so that the dangers of corrosion, polymerization, and destructive decomposition exist when these grades are in contact with metals such as aluminum and iron, particularly under conditions encountered during distillation. Depending upon the types of organic chlorides present, the polymerization can be either or both of vinyl polymerization and a polyalkylation reaction of the Friedel-Crafts type initiated by aluminum chloride resulting from the attack of reactive chlorides upon aluminum.

It is known to avoid decomposition and polymerization by distilling crude vinylbenzyl chloride and related compounds in the presence of a combination of an alkylene oxide and a nitroaromatic compound, see Hoffenberg et al. U.S. Pat. No. 3,274,077. Although this combination is effective in titanium equipment, the alkylene oxide will react with the hydrogen chloride often liberated under distillation conditions and the chlorohydrin thereby formed is corrosive to metal surfaces.

SUMMARY OF THE INVENTION

It has now been found that the presence of a relatively small concentration of a nitro lower alkane is effective to prevent the reaction of aluminum with $\alpha$-chloroalkyl aromatics and $\alpha$-chloroalkenyl aromatics such as described above during storage, distillation, or other handling or processing. The chlorine-containing aromatics thereby inhibited against decomposition and corrosion or polymerization are represented by the formula

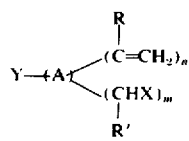

wherein A is a benzene or naphthalene nucleus, Y is H or lower alkyl, R and X each are Cl or H, at least one being Cl, R' is H, CH$_3$, or CH$_2$Cl, m is one or two, and n is zero or one.

Nitro lower alkanes are those of 1–4 carbon atoms and include nitromethane, nitroethane, and the nitropropanes and nitrobutanes. A concentration of about 0.1–5 percent by weight is effective and more can be used but is not necessary. Nitromethane is preferred. The nitroalkane inhibitor may be used in combination with one or more known polymerization inhibitors such as o-nitrophenol, and dinitro-o-cresol.

DETAILED DESCRIPTION

The nitroalkane inhibitor is particularly useful in the storage, handling and shipping of benzyl chloride and in the distillation or other handling of crude vinylbenzyl chloride as obtained from the high temperature gas phase chlorination of vinyltoluene. Use of the inhibitor thereby permits the use of aluminum or iron containers or equipment which would otherwise be impractical. For example, when crude vinylbenzyl chloride containing significant amounts of ($\alpha$-chlorovinyl)toluene and other reactive impurities is distilled in contact with aluminum equipment or distillation column packing, as the mixture is heated for longer periods and particularly as local concentrations of reactive impurities occur, the aluminum is corroded and insoluble polymer is formed at an increasingly rapid rate which soon causes plugging of the distillation column. The defined nitroalkane inhibitor is effective to prevent both the corrosion of aluminum and the polymerization.

EXAMPLE 1

A clean aluminum coupon (alloy 6061) was dipped in a container of benzyl chloride at 125°C. Red spots soon appeared on the metal surface and a vigorous reaction with the metal started with darkening of the liquid and copious evolution of HCl. Addition of about one percent by weight of nitromethane at the red spot stage prevented further reaction. When the benzyl chloride initially contained the nitromethane, no visible reaction took place.

EXAMPLE 2

The procedure of Example 1 was repeated with ($\alpha$-chlorovinyl)toluene in place of benzyl chloride. Essentially the same results were observed.

EXAMPLE 3

The crude reaction product from a high temperature gas phase chlorination of vinyltoluene consisted essentially of about 60% unreacted vinyltoluene, 30% vinylbenzyl chloride, 3% $\alpha$-chlorovinyltoluene, and 6% 1,2-dichloro-1-tolylethane. When this was distilled through an aluminum column to separate the ($\alpha$-chlorovinyl)-toluene, there was considerable corrosion of the aluminum, formation of polymer in the column, and evolution of HCl. Addition of 1% by weight nitromethane resulted in essential elimination of decomposition and polymerization reactions.

Addition of butylene oxide or p-dioxane, two inhibitors used to prevent reaction of methylchloroform with aluminum, in place of the nitromethane in the above distillation was ineffective to prevent the aluminum reaction.

EXAMPLES 4–7

A series of experiments was run in which 0.25 ml. of nitro compound was added to 5 ml. of benzyl chloride in a test tube, a small piece of aluminum was put in the liquid, and the upright test tube was immersed to a depth of two inches in an oil bath held at 125°C. Column packing of 3003 Al was used in all experiments except with nitromethane where an aluminum tubing fitting of 5052 Al was used. Nitrocyclohexane and nitrobenzene were run for comparison. Results were as follows:

| Nitro Compound | Effect Observed |
|---|---|
| None | 2 min. 50 sec., reaction started |
|  | 3 min. 10 sec., bubbles of HCl |
|  | 4 min. 5 sec., vigorous reaction |
| nitrocyclohexane | reaction started at 4 min. 5 sec. |
| nitrobenzene | reaction started at 4 min. 50 sec. |
| nitromethane | no visible reaction at 30 min. |
| nitroethane | no visible reaction at 30 min. |
| 1-nitropropane | no visible reaction at 30 min. |
| 2-nitropropane | no visible reaction at 30 min. |

EXAMPLE 8

The procedure of Examples 4–7 was repeated using ethylbenzyl chloride (mixed isomers) and 6061 Al turnings. With no inhibitor added, at 125°C. reaction started at 14 minutes. With 1% by weight nitromethane present, no visible reaction occurred after 30 minutes.

EXAMPLE 9

As in Examples 4-8, 1-chloromethyl naphthalene was heated at 125°C. in the presence of 1100 Al foil. With no inhibitor added, reaction started at 15 minutes. When 1% by weight of nitromethane was present, there was no visible reaction after 30 minutes.

EXAMPLE 10

A sample of $\alpha,\alpha'$-dichloro-p-xylene is heated as in Examples 4–9 in the presence of 1100 Al and 5% by weight of nitromethane. No visible attack on the aluminum is observed after 30 minutes.

We claim:

1. A chlorinated aromatic compound of the formula

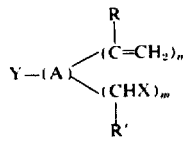

wherein A is a benzene or naphthalene nucleus, Y is H or lower alkyl, R and X are each Cl or H, at least one of R and X being Cl, R' is H, $CH_3$ or $CH_2Cl$, m is one or two, and n is 0 or 1 containing as the essential stabilizer against attack by aluminum of at least about 0.1 percent by weight of a nitroalkane of 1–4 carbon atoms.

2. The composition of claim 1 wherein the nitroalkane is nitromethane.

3. The composition of claim 2 wherein the nitroalkane is present in a concentration of about 0.1–5 percent by weight.

4. The composition of claim 2 wherein the chlorinated aromatic compound is benzyl chloride.

5. The composition of claim 2 wherein the chlorinated aromatic compound is ($\alpha$-chlorovinyl)toluene.

6. The composition of claim 2 wherein the chlorinated aromatic compound is the crude reaction product obtained from the high temperature gas phase chlorination of vinyltoluene.

7. The composition of claim 2 wherein the chlorinated aromatic compound is 1-chloromethylnaphthalene.

8. The composition of claim 2 wherein the chlorinated aromatic compound is ethylbenzyl chloride.

9. The composition of claim 2 wherein the chlorinated aromatic compound is $\alpha,\alpha'$-dichloro-p-xylene 10. The composition of claim 1 wherein the nitroalkane is nitroethane.

11. The composition of claim 1 wherein the nitroalkane is a nitropropane.

* * * * *

UNITED STATES PATENT AND TRADEMARK OFFICE
CERTIFICATE OF CORRECTION

PATENT NO. : 3,919,335

DATED : November 11, 1975

INVENTOR(S) : Richard H. Hall; Daniel H. Haigh; Wesley L. Archer; Peter West

It is certified that error appears in the above-identified patent and that said Letters Patent are hereby corrected as shown below:

Under "References Cited" insert:

| | | | |
|---|---|---|---|
| --3,274,077 | 9/1966 | Hoffenberg et al. | 260/651 R X |
| 2,540,869 | 2/1951 | Erickson | 260/651 R X |
| 2,542,225 | 2/1951 | West | 260/651 R |
| 2,803,674 | 8/1957 | Heiberger et al. | 260/651 R |
| 2,805,265 | 9/1957 | Heiberger | 260/651 R |
| 2,964,572 | 12/1960 | Miller et al. | 260/651 R-- |

Signed and Sealed this second Day of March 1976

[SEAL]

Attest:

RUTH C. MASON
Attesting Officer

C. MARSHALL DANN
Commissioner of Patents and Trademarks